Feb. 22, 1949.        T. D. PEAT        2,462,126
LATHE ATTACHMENT
Filed Sept. 7, 1945
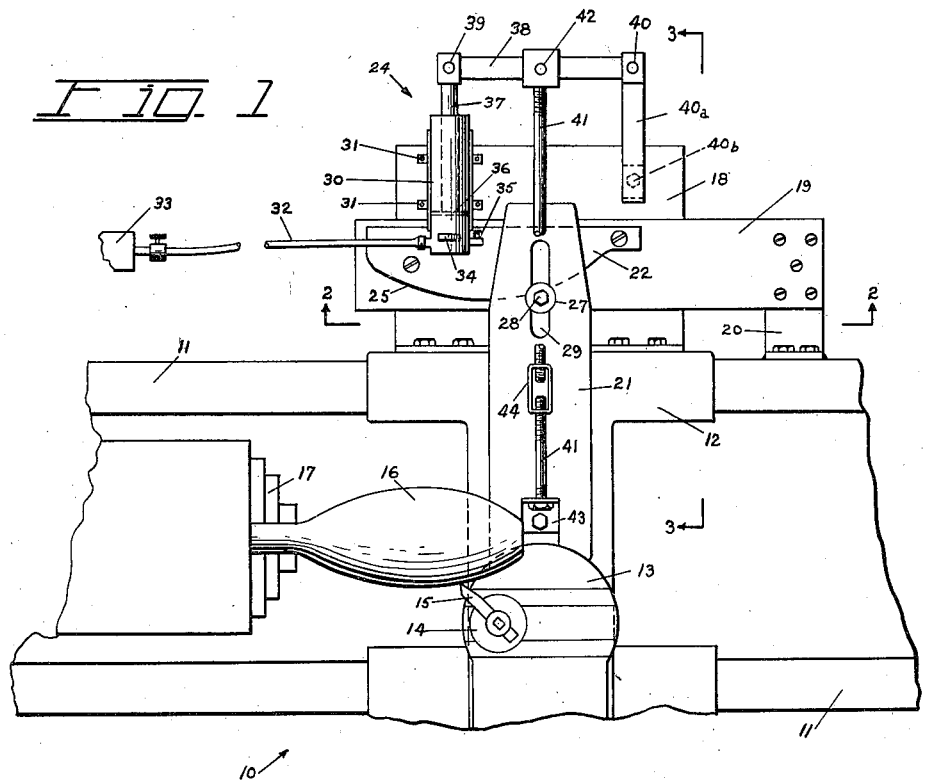
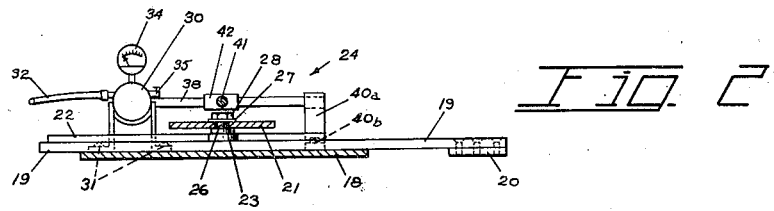
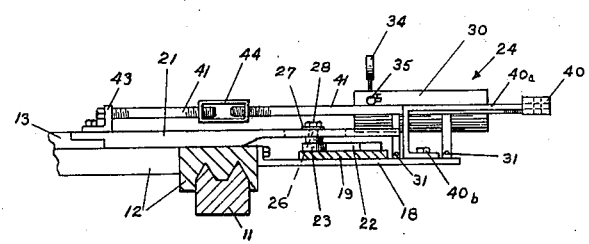
INVENTOR.
THOMAS D. PEAT.
BY
Ralph Chappell
ATTORNEY.

Patented Feb. 22, 1949

2,462,126

UNITED STATES PATENT OFFICE 2,462,126

LATHE ATTACHMENT

Thomas D. Peat, New York, N. Y.

Application September 7, 1945, Serial No. 615,066

4 Claims. (Cl. 82—14)

(Granted under the act of March 3, 1883, as amended April 30, 1928; 370 O. G. 757)

This invention relates to a lathe attachment.

An object of this invention is to provide a lathe attachment for cutting and duplicating contours.

Further objects and advantages of this invention, as well as its construction, arrangement and operation, will be apparent from the following description and claims in connection with the accompanying drawings, in which, Fig. 1 is a plan view showing a portion of a lathe with the device of this invention attached thereon, Fig. 2 is a sectional view taken on the line 2—2 of Fig. 1, and Fig. 3 is a sectional view taken on the line 3—3 of Fig. 1.

Fig. 1 shows a conventional lathe, generally designated as 10, comprising ways 11, having a saddle 12 mounted thereon. A compound rest 13 having a tool post 14 provided with a cutting tool 15 is positioned upon the saddle 12. A piece of work 16 to be machined is held in chuck 17.

The lathe 10 is provided with a conventional taper attachment comprising an angle base 18 detachably secured to the saddle 12, a table 19 detachably secured by a bracket 20 to the ways 11, and a connecting slide 21 detachably secured to the compound rest 13.

The attachment of this invention comprises a template 22 detachably mounted upon the table 19 or if desired upon the taper attachment swivel bar (not shown), a roller 23 (Figs. 2 and 3) secured to the connecting slide 21 for following the template 22, and a compressed-air holding device, generally designated as 24, for holding the roller 23 against the template 22.

The template 22 is cut from a suitable piece of flat stock to provide any contour desired upon the finished piece of work. The template 22 as shown is provided with an arcuate edge 25. The resulting contour of the piece of work 16 is identical to that of the template edge 25.

The roller 23, which is ball bearing mounted, is provided with a shaft 26 (Figs. 2 and 3) attached as by a washer 27 and nut 28 in slot 29 (Fig. 1) in the connecting slide 21 in the position usually occupied by the shoe of the conventional taper attachment.

The holding device 24 comprises an air chamber 30 detachably mounted upon the angle base 18 as at 31, and provided with an air hose 32 connected to a compressed-air source 33. A pressure gauge 34 and bleeder valve 35 are provided so that any desired air pressure can be maintained within the air chamber. A pressure of about 40 p. s. i. is generally sufficient. The air chamber is also provided with a plunger 36 (Fig. 1) having a stem 37 that extends through the chamber end and is rotatably attached to a crossarm 38 as at 39. The crossarm 38 is rotatably attached at its other end as at 40 to a support 40a also detachably mounted upon the angle base 18 as at 40b. One end of a connecting rod 41 is rotatably attached as at 42 to the crossarm 38. The other end of this rod 41 is connected to a lug 43 (Fig. 3) bolted or otherwise secured to the compound rest 13. Optionally the rod 41 can be attached to the connecting slide 21. Thus by means of air pressure against the plunger 36 a steady pull is maintained upon the compound rest 13 which forces the roller 23 against the template 22 at all times. The compound rest 13 and cutting tool 15 thereby follow the contour of the template 22 as the saddle 12 moves upon the ways. The work 16 is automatically cut to the contour of the template.

The air chamber 30, and crossarm 38 are mounted at a sufficient height above the angle base 18 to allow the connecting rod 41 to clear the connecting slide 21 and assembly (see Figs. 2 and 3).

The connecting rod 41 is also provided with turnbuckle 44, for enabling it to be shortened or lengthened according to the size of the work, or to whether inside boring or according outside turning is to be done. The position of the roller 23 can likewise be changed as desired by securing the shaft 26 in any position in the slot 29.

The device of this invention can be altered to fit other types of taper attachments, and suitable support members can be provided for lathes having no taper attachment. If the lathe to be used has no attachment a suitable base 18, table 19, and connecting slide 21 can be provided as shown.

In operation, the desired contour of the finished piece of work is ascertained and a suitable template cut out of a piece of flat stock. The template is then secured as described. The roller 23 is properly positioned and holding device 24 mounted and assembled. The air hose 32 is connected to the air source and the pressure in the air chamber 30 adjusted. The work is placed in the chuck 17 as shown. The lathe is now started and the tool 15 takes a cut following the contour of the template. After the initial adjustment, duplication work can be accurately and swiftly accomplished by relatively unskilled personnel.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In combination with a lathe having a taper attachment including an angle base, table and connecting slide; a contour-duplicating attachment comprising a template detachably secured to said table, roller means adjustably secured to said connecting slide for following said template, a compressed-air chamber having a plunger and stem mounted upon said base, a support mounted upon said base, a crossarm rotatably secured at one end to said plunger stem and at the other end to said support, and a connecting member rotatably secured to said crossarm and to said connecting slide and responsive to the air pressure in said air chamber yieldably to hold said roller means against said template.

2. In combination with a lathe having ways, a saddle, and a compound rest, a contour-duplicating attachment comprising a base detachably secured to said saddle, a table mounted above said base and detachably secured to said ways, a template detachably mounted upon said table, a connecting slide detachably secured to said compound rest, roller means adjustably positioned upon said connecting slide for following said template, a compressed-air chamber having a plunger and stem mounted upon said base, means connecting said air chamber to a source of compressed air, means for indicating the pressure in said air chamber, valve means for controlling the pressure in said air chamber, a support mounted upon said base, a crossarm rotatably secured at one end to said plunger stem and at the other end to said support, and a connecting member rotatably secured to said crossarm and to said compound rest and responsive to the air pressure in said air chamber yieldably to hold said roller means against said template.

3. In combination with a lathe having a taper attachment including an angle base, table and connecting slide; a contour-duplicating attachment comprising a template detachably secured to said table, means adjustably secured to said connecting slide for following said template, a fluid-pressure chamber having a plunger and stem mounted upon said base, a support mounted upon said base, a cross-arm rotatably secured at one end to said plunger stem and at the other end to said support, and a connecting member rotatably secured to said crossarm and to said connecting slide and responsive to the fluid pressure in said chamber yieldably to hold said means against said template.

4. In combination with a lathe having ways, a saddle, and a slide; a contour-duplicating attachment comprising a template fixedly secured with respect to said ways, means secured to said slide for following said template, a fluid-actuated element mounted for movement on said base, a support mounted on said saddle, a crossarm rotatably secured at an end to said element and at the other end to said support, and a connecting member rotatably secured to said crossarm and to said slide and responsive to the actuating-fluid pressure yieldably to hold said means against said template.

THOMAS D. PEAT.

REFERENCES CITED

The following references are of record in the file of this patent:

UNITED STATES PATENTS

| Number | Name | Date |
|---|---|---|
| 253,410 | Miles | Feb. 7, 1882 |
| 1,320,162 | Marsh | Oct. 28, 1919 |
| 1,442,661 | Groene | Jan. 16, 1923 |
| 1,933,224 | Smith | Oct. 31, 1933 |
| 2,370,032 | Groen | Feb. 20, 1945 |
| 2,401,422 | Hamilton | June 4, 1946 |